United States Patent
Sharma

(10) Patent No.: US 12,358,805 B2
(45) Date of Patent: *Jul. 15, 2025

(54) PROCESSING OF LITHIUM CONTAINING BRINES

(71) Applicant: Reed Advanced Materials Pty Ltd., West Perth (AU)

(72) Inventor: Yatendra Sharma, Hillarys (AU)

(73) Assignee: Reed Advanced Materials Pty Ltd., West Perth (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,249

(22) Filed: Nov. 22, 2023

(65) Prior Publication Data

US 2024/0092647 A1 Mar. 21, 2024

Related U.S. Application Data

(63) Continuation of application No. 17/263,648, filed as application No. PCT/AU2019/051014 on Sep. 20, 2019, now Pat. No. 11,932,550.

(30) Foreign Application Priority Data

Oct. 1, 2018 (AU) ................ 2018903704

(51) Int. Cl.
| | |
|---|---|
| *C01D 15/08* | (2006.01) |
| *B01D 9/00* | (2006.01) |
| *B01D 61/02* | (2006.01) |
| *B01J 39/07* | (2017.01) |
| *B01J 47/026* | (2017.01) |
| *C02F 1/42* | (2023.01) |
| *C02F 1/44* | (2023.01) |
| *C22B 26/12* | (2006.01) |
| *C25B 1/16* | (2006.01) |
| *C02F 101/10* | (2006.01) |
| *H01M 4/04* | (2006.01) |

(52) U.S. Cl.
CPC ........... *C01D 15/08* (2013.01); *B01D 9/0022* (2013.01); *B01D 61/027* (2013.01); *B01J 39/07* (2017.01); *B01J 47/026* (2013.01); *C02F 1/42* (2013.01); *C02F 1/442* (2013.01); *C22B 26/12* (2013.01); *C25B 1/16* (2013.01); *C01P 2006/40* (2013.01); *C02F 2101/101* (2013.01); *C02F 2101/108* (2013.01); *H01M 4/0438* (2013.01)

(58) Field of Classification Search
CPC ..................................................... C01D 15/08
See application file for complete search history.

(56) References Cited

U.S. PATENT DOCUMENTS

| | | | |
|---|---|---|---|
| 9,034,294 B1 | 5/2015 | Harrison | |
| 11,932,550 B2 * | 3/2024 | Sharma | ............... C01D 15/02 |
| 2011/0044882 A1 | 2/2011 | Buckley et al. | |
| 2015/0109783 A1 | 4/2015 | Peng | |
| 2015/0197830 A1 * | 7/2015 | Chon | .................. C22B 26/12 |
| | | | 423/179.5 |
| 2018/0147531 A1 | 5/2018 | Park et al. | |

FOREIGN PATENT DOCUMENTS

| | | |
|---|---|---|
| CL | 2012000079 A1 | 2/2012 |
| CN | 102016123 A | 4/2011 |
| CN | 106395864 A | 2/2017 |
| CN | 108341420 A | 7/2018 |
| MX | 2010011560 A | 4/2011 |
| RU | 2157338 C2 | 10/2000 |
| WO | 2009131628 A1 | 10/2009 |
| WO | 2012099637 A1 | 7/2012 |
| WO | 2016070217 A1 | 5/2016 |
| WO | 2018085915 A1 | 5/2018 |

OTHER PUBLICATIONS

International Search Report for International Application No. PCT/AU2019/051014 dated Nov. 29, 2019.
Opposition from corresponding Chilean Patent Application; Chilean National Phase Entry based on the same PCT/AU2019/051014.
Oct. 8, 2022 Examination Report and Office Action issued in co-pending Chinese Patent Application 201980064704.6.
Mar. 27, 2023 Office Action of examination of a corresponding application in Argentina No. 2018903704 Jan. 10, 2018.

* cited by examiner

*Primary Examiner* — Stuart L Hendrickson
(74) *Attorney, Agent, or Firm* — Clements Bernard Walker; Christopher L. Bernard; Devin Cummins

(57) ABSTRACT

A method (10) for the processing of lithium containing brines, the method comprising the method steps of:
(i) Passing a lithium containing brine (12) to a filtration step (14) to remove sulphates;
(ii) Passing a product (16) of step (i) to a first ion exchange step (18) to remove divalent impurities;
(iii) Passing a product (20) of step (ii) to a second ion exchange step (22) to remove boron impurities;
(iv) Passing a product (24) of step (iii) to an electrolysis step (26) to produce lithium hydroxide (28); and
(v) Passing a product (30) of step (iv) to a crystallisation step (32) that in turn provides a lithium hydroxide monohydrate product (34).

14 Claims, 10 Drawing Sheets

| PRODUCT: LITHIUM HYDROXIDE MONOHYDRATE  PRODUCED BY: ELECTROLYSIS PROCESS IN PTO SEMI- PILOT PLANT |||
|---|---|---|
| SPECIES | (PTO) RESULTS | PRO-RATA AT LiOH 56.5% |
| LiOH (wt%) | 69.5 | 56.5 |
| $SO_4$ (wt%) | 0.0007 | 0.0006 |
| Ag (ppm) | 0.01 | 0.01 |
| Al (ppm) | 3.60 | 2.93 |
| As (ppm) | 0.33 | 0.27 |
| B (ppm) | 1.87 | 1.52 |
| Ba (ppm) | 0.55 | 0.44 |
| Be (ppm) | 0.01 | 0.01 |
| Bi (ppm) | 094 | 0.76 |
| Ca (ppm) | 0.69 | 0.56 |
| Cd (ppm) | 0.07 | 0.06 |
| Co (ppm) | 0.26 | 0.21 |
| Cr (ppm) | 0.06 | 0.05 |
| Cu (ppm) | 0.12 | 0.09 |
| Fe (ppm) | 0.10 | 0.08 |
| K (ppm) | 1.58 | 1.29 |
| Mg (ppm) | 0.20 | 0.16 |
| Mn (ppm) | 0.01 | 0.01 |
| Mo (ppm) | 0.50 | 0.41 |
| Na (ppm) | 0.66 | 0.54 |
| Ni (ppm) | 0.26 | 0.21 |
| P (ppm) | 0.81 | 0.66 |
| Pb (ppm) | 0.42 | 0.34 |
| Sb (ppm) | 0.56 | 0.46 |
| Se (ppm) | 5.18 | 4.21 |
| Si (ppm) | 4.03 | 3.28 |
| Sn (ppm) | 2.74 | 2.22 |
| Sr (ppm) | 0.01 | 0.01 |
| Ti (ppm) | 0.09 | 0.07 |
| Tl (ppm) | 1.05 | 0.85 |
| V (ppm) | 0.06 | 0.05 |
| Zn (ppm) | 0.07 | 0.06 |

Figure 9

| Assay | |
|---|---|
| $Li_2CO_3$ (%w/w) | 99.5 (Min) |
| $Li_2CO_3$ (%w/w) Dry Basis | 99.9 (Min) |
| $H_2O$ (%w/w) | <0.40 |
| Na (ppm) | 21 |
| Ca (ppm) | <10 |
| Cl (ppm) | <25 |
| K (ppm) | <10 |
| $SO_4$ (%w/w) | <0.01 |
| Al (ppm) | <10 |
| Ni (ppm) | <10 |

Figure 10

PROCESSING OF LITHIUM CONTAINING BRINES

CROSS-REFERENCE TO RELATED APPLICATION(S)

This application is a Continuation Patent Application of U.S. patent application Ser. No. 17/263,648 filed on Jan. 27, 2021, which is a National Stage Application, filed under 35 U.S.C. Section 371 of International Application No. PCT/AU2019/051014, filed Sep. 20, 2019, which claims priority to Australian Application No. 2018903704, filed Oct. 1, 2018; the contents of all of which are hereby incorporated by reference in their entirety.

FIELD OF THE INVENTION

The present invention relates to a method for the processing of lithium containing brines.

More particularly, the method of the present invention is intended for use in the production of a lithium bearing solution suitable for further processing by electrolysis. In turn, it is particularly intended that the processing by electrolysis of the lithium bearing solution provides a lithium hydroxide monohydrate product.

The present invention further relates to the production of a lithium hydroxide monohydrate and/or lithium carbonate that is/are of battery grade.

BACKGROUND ART

The current process employed by brine producers requires first the conversion of lithium containing brine to lithium carbonate, requiring treatment with sodium carbonate (soda ash) to precipitate the lithium carbonate. This lithium carbonate is then causticised using hydrated lime. This process is known to be expensive and it employs complicated process unit operations. The lithium carbonate produced in this manner by brine producers, using the soda ash reaction on a lithium chloride solution, produces technical grade lithium carbonate. The technical grade lithium carbonate in turn needs to be further purified using an expensive bicarbonation circuit.

Lithium containing brines obtained from solar brine ponds typically contain a number of impurities, present at what are considered by operators as high levels. As such, these lithium containing brines are not considered suitable for electrolysis.

The method and product of the present invention have as one object thereof to overcome substantially one or more of the above mentioned problems associated with the methods and products of the prior art, or to at least provide useful alternatives thereto.

The preceding discussion of the background art is intended to facilitate an understanding of the present invention only. This discussion is not an acknowledgement or admission that any of the material referred to is or was part of the common general knowledge as at the priority date of the application.

Throughout the specification and claims, unless the context requires otherwise, the word "comprise" or variations such as "comprises" or "comprising", will be understood to imply the inclusion of a stated integer or group of integers but not the exclusion of any other integer or group of integers.

Throughout the specification and claims, unless the context requires otherwise, the term "battery grade lithium carbonate" refers to a product having a purity of about 99.5% or higher. Similarly, the term "battery grade lithium hydroxide" refers to a product having a purity of about 99% or higher.

The term brine, or brines, or variations thereof, is to be understood to include a solution of alkali and/or alkaline earth metal salt(s) in water, of a natural or possibly industrial source. The concentrations of the various salts can vary widely. The ions present in brines may include a combination of one or more of a monovalent cation, such as lithium, multivalent cations, monovalent anions, and multivalent anions.

DISCLOSURE OF THE INVENTION

In accordance with the present invention there is provided a method for the processing of lithium containing brines, the method comprising the method steps of:
(i) Passing a lithium containing brine to a filtration step to remove sulphates;
(ii) Passing a product of step (i) to a first ion exchange step to remove divalent impurities;
(iii) Passing a product of step (ii) to a second ion exchange step to remove boron impurities;
(iv) Passing a product of step (iii) to an electrolysis step to produce lithium hydroxide; and
(v) Passing a product of step (iv) to a crystallisation step that in turn provides a lithium hydroxide monohydrate product.

In one form, the present invention further comprises passing a spent liquor from the crystallisation step (v) to a carbonation step (vi) in which the spent liquor is reacted with carbon dioxide forming lithium bicarbonate. The thus formed lithium bicarbonate is preferably then heated in a heating step (vii) to precipitate lithium carbonate.

In a further form, the present invention further comprises the washing, drying and micronising of the precipitated lithium carbonate.

Preferably, the filtration step (i) utilises nano-filtration. Still preferably, the filtration step removes sulphates from the lithium brine to a level of less than 1 gpl.

Preferably, the ion exchange step (ii) removes divalent impurities selected from the group of calcium, magnesium, strontium, and barium. Still preferably, the ion exchange step (ii) removes the divalent impurities from the lithium brine to a level of less than 0.1 ppm.

Preferably, the ion exchange step (iii) removes boron impurities from the lithium brine. Still preferably, the ion exchange step (iii) removes boron impurities from the lithium brine to a level of less than 0.1 ppm.

Preferably, the crystallisation step (v) utilises high vacuum low temperature multiple effect crystallisation techniques and apparatus.

BRIEF DESCRIPTION OF THE DRAWINGS

The present invention will now be described, by way of example only, with reference to the accompanying drawings, in which:

FIG. 9 is a table of the specification of the lithium hydroxide monohydrate product that can be obtained using the method of the present invention; and FIG. 10 is a table of the specification of the lithium carbonate product that can be obtained using the method of the present invention.

BEST MODE(S) FOR CARRYING OUT THE INVENTION

The present invention provides a method for the processing of lithium containing brines, the method comprising the method steps of:
  (i) Passing a lithium containing brine to a filtration step to remove sulphates;
  (ii) Passing a product of step (i) to a first ion exchange step to remove divalent impurities;
  (iii) Passing a product of step (ii) to a second ion exchange step to remove boron impurities;
  (iv) Passing a product of step (iii) to an electrolysis step to produce lithium hydroxide; and
  (v) Passing a product of step (iv) to a crystallisation step that in turn provides a lithium hydroxide monohydrate product.

The method of the present invention, in one embodiment thereof, further comprises passing a spent liquor from the crystallisation step (v) to a carbonation step (vi) in which the spent liquor is reacted with carbon dioxide forming lithium bicarbonate. The thus formed lithium bicarbonate is then heated in a heating step (vii) to precipitate lithium carbonate. The precipitated lithium carbonate is then washed, dried and micronised.

The filtration step (i) utilises nano-filtration and removes sulphates from the lithium brine to a level of less than 1 gpl. The ion exchange step (ii) removes divalent impurities selected from the group of calcium, magnesium, strontium, and barium to a level of less than 0.1 ppm.

The ion exchange step (iii) removes boron impurities from the lithium brine to a level of less than 0.1 ppm.

The crystallisation step (v) utilises high vacuum low temperature multiple effect crystallisation techniques and apparatus. Evaporators are classified by the number of effects. For example, a single-effect evaporator uses steam to provide energy for vaporisation. The vapour product is condensed and removed from the system. Similarly, in a double-effect evaporator, the vapour product off the first effect is used to provide energy for a second vaporisation unit. In turn, the cascading of effects can continue over many stages. Multiple-effect evaporators can remove much larger amounts of solvent than is possible in a single effect. In a multiple effect arrangement, the latent heat of the vapour product from one effect is used to heat the following effect.

Figure 1:
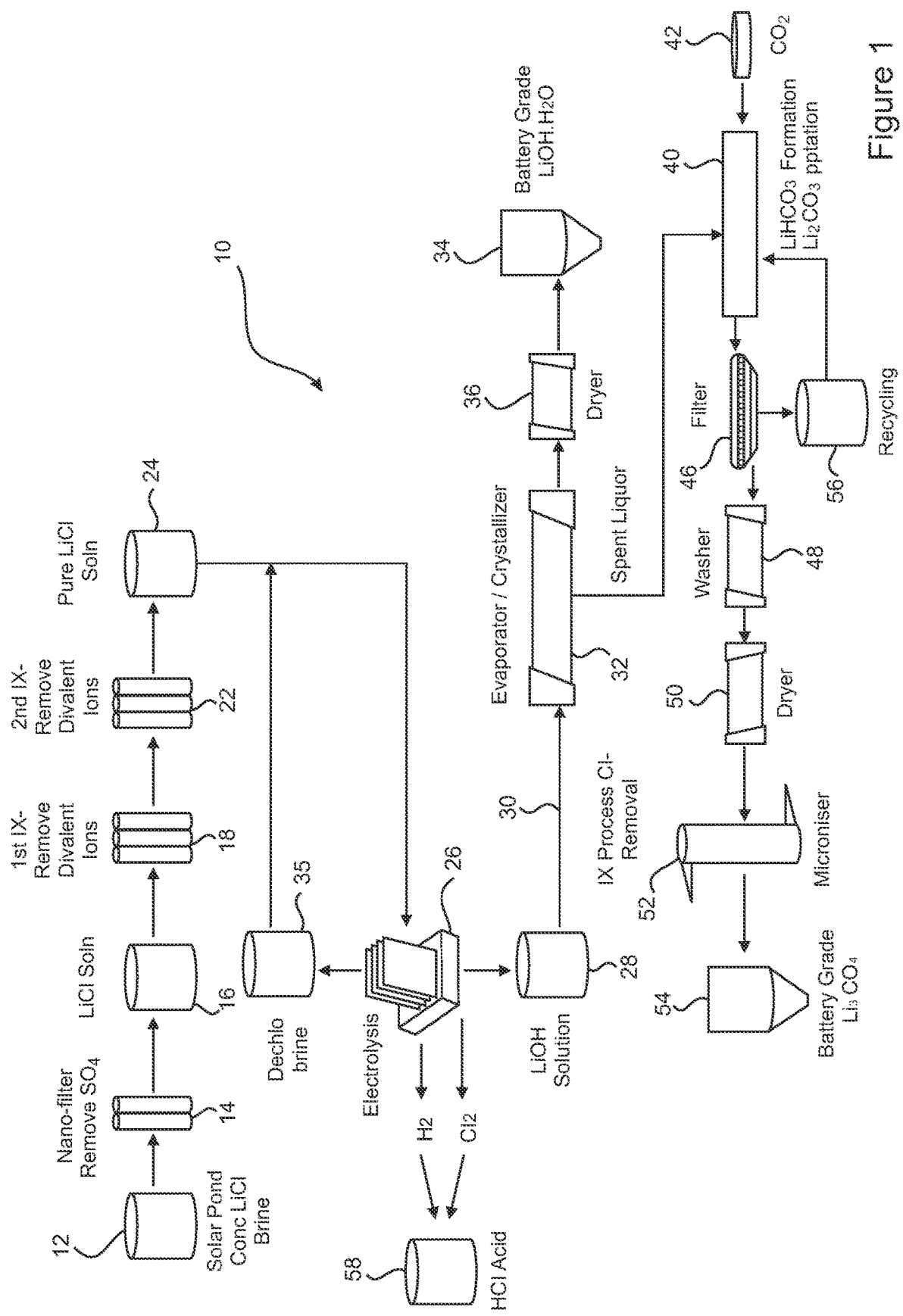
FIG. 1 is a flow-sheet of a method for the processing of lithium containing brines, the method being in accordance with one embodiment of the present invention.

In FIG. 1 there is shown a flow-sheet representing a method 10 for the processing of lithium containing brines, the method 10 being in accordance with one embodiment of the present invention.

The method 10 comprises the method steps of:
  (i) Passing a lithium containing brine 12 to a filtration step 14 in which sulphates are substantially removed;
  (ii) Passing a product 16 of step (i) to a first ion exchange step 18 to substantially remove divalent impurities;
  (iii) Passing a product 20 of step (ii) to a second ion exchange step 22 to substantially remove boron impurities;
  (iv) Passing a product 24 of step (iii), comprising a substantially pure lithium chloride solution, to an electrolysis step 26 to produce a lithium hydroxide solution 28; and
  (v) Passing a product 30 of step (iv) to a crystallisation step 32, from which a battery grade lithium hydroxide monohydrate 34 is obtained, by way of a drying step 36.

A dechlorinated brine 35 from the electrolysis step 26 may be recycled to the product 24 of step (iii) as further feed to the electrolysis step 26.

The method 10 of the present invention, in one embodiment thereof, further comprises passing a spent liquor 38 from the crystallisation step (v) 32 to a carbonation step (vi) 40, in which the spent liquor 38 is reacted with carbon dioxide 42 forming lithium bicarbonate. The thus formed lithium bicarbonate is then heated in a heating step (vii) 44 to precipitate lithium carbonate. The precipitated lithium carbonate is filtered 46, then washed 48, dried 50 and micronised 52. These steps provide a battery grade lithium carbonate 54.

Liquid from the filtration 46 of the lithium carbonate precipitated in the heating step 44 is recycled 56 to the carbonation step 40.

The filtration step (i) 14 utilises nano-filtration and removes sulphates from the lithium brine 12 to a level of less than 1 gpl. The first ion exchange step (ii) 18 removes divalent impurities selected from the group of calcium, magnesium, strontium, and barium to a level of less than 0.1 ppm.

The ion exchange step (iii) 22 removes boron impurities from the lithium brine to a level of less than 0.1 ppm.

The electrolysis step 26 produces, in addition to the lithium hydroxide solution 28, both hydrogen and chlorine gas. The hydrogen and chlorine gases are catalytically combined to produce hydrochloric acid 58.

The crystallisation step (v) 32 utilises high vacuum low temperature multiple effect crystallisation techniques and apparatus.

The method of the present invention may be further understood with reference to the following non-limiting example.

Example 1

A typical solar dried brine composition is provided in Table 1 below together with some typical physical characteristics thereof.

TABLE 1

Brine Composition and Characteristics

| Item | % |
|---|---|
| Lithium Chloride | 30.0 |
| Sodium Borate | 0.05 |
| Calcium Chloride | 0.01 |
| Potassium Chloride | 0.80 |
| Sodium Chloride | 3.50 |
| Magnesium Chloride | 0.04 |
| Sodium Sulphate | 0.34 |
| Water | 65.26 |
| SG | 1.17 |
| pH | 8.90 |

Sulphates in the typical brine from a solar dried pond operation, predominantly present as sodium sulphate, are recorded at 0.34% (3.40 g/L). The Applicant has determined that the maximum allowable sulphate present as sodium sulphate for electrolysis should not exceed 1 g/L. The Applicant has determined that nano-flitration is the preferred mechanism to remove sulphate ions. Two membranes, both from Dow, Dow N90™ membrane and Dow XUS290504™ were found to be very successful in removing sulphate ions to an acceptable level. The results are provided below. The best performance was observed by Dow XUS290504™ membrane. Dow XUS290504™ membrane performed better in rejection rate, however at a lower reflux rate.

A simulated brine was filtered through 0.4 µm glass fibre filter prior to analysis to remove fines and particulate matter (NTU un-filtered brine—6.42; filtered—0.20 NTU). The nano filtration (NF) membranes were wetted in ultrapure water for 24 hours prior to use. A dead end filtration cell from Sterlitech HP4750™ was rinsed with ultrapure water and assembled with the wetted membrane in the correct orientation. The filtration system was assembled on a magnetic stirrer plate (set to 300 rpm) and connected to a size G nitrogen gas cylinder. The mass of the filtrate was recorded every second and converted to a flux rate (L·min-1·m-2) by incorporating the membrane surface area and solution density.

Ultrapure water was passed through the membrane until a stable flux was observed. Simulated brine (150 mL) was added to the cell reservoir and filtered until a minimum of 10 mL of filtrate was collected. The filtrate collected was sampled for ICP-OES analysis (1 mL aliquot), acidified with 200 µL of HCl and 200 µL $HNO_3$ and diluted to 10 mL volume with 2% $HNO_3$.

The Dow membranes were prepared by cutting a 150 mm cross-section of the membrane module. Each membrane was unwound where a 300 mm strip of flat sheet membrane was obtained. Five 47 mm discs were cut and placed immediately in ultrapure water. The remaining membrane section, as well as the unused membrane module, were wetted with sodium metabisulfite (50 ppm as $SO_2$) and stored at 4° C. for future use.

Brine samples were analysed using a Perkin Elmer 8300DV™ ICP-OES fitted with an ESI SC-4DX™ autosampler and PrepFAST 2™ sample handling unit for online internal standardisation and auto-dilution of samples and calibration standards. Purified nitric acid was used for the preparation of all standards and blank solutions used throughout the analysis.

Instrument calibration was performed using multi-element standards prepared in-house from Inductively Coupled Plasma Mass Spectrometer (ICP-MS) grade single element stock solutions (High Purity Standards, Charleston, USA). Method robustness, accuracy and precision was verified by continuing analysis of a number of Certified Reference Materials (CRM's) covering a range of common matrices and analyte concentrations (NIST, Gaithersburg, MD, USA, United States Geological Survey, Reston, VA, USA).

All brine samples were analysed in 1:10 and 1:10,000 dilution to report the entire suite of elemental composition.

Table 2 below depicts that both Dow N90™ as well as Dow XUS290504™ membrane are suitable for removing sulphates to an acceptable level. Dow XUS290504™ membrane performed better in rejection rate however at a lower reflux rate.

TABLE 2

Sulphate Removal Results

| | Mg | Ca | S | B | Li | Na | K | Sr |
|---|---|---|---|---|---|---|---|---|
| DOW N90 (Flux 0.06 L/min/m²) 20 bar | | | | | | | | |
| Filtrate (mg/L) | 25.6 | 23.36 | 108.3 | 7.697 | 48490 | 7999 | 3126 | 0.4072 |
| Rejection (%) | 67.7 | 26.6 | 86.5 | 70.8 | 1.6 | 8.0 | 13.1 | 47.2 |
| DOW XUS290504 (Flux 0.03 L/min/m²) 20 bar | | | | | | | | |
| Filtrate (mg/L) | 20.39 | 16.11 | 44.35 | 8.299 | 49920 | 7246 | 2598 | 0.263 |
| Rejection (%) | 77.1 | 45.3 | 94.3 | 70.3 | 2.2 | 16.9 | 26.6 | 64.6 |

LiCl containing brine solution obtained after the nano-filtration step, was now within acceptable levels of sulphates, but still contained impurities including alkaline earth metal cations, for example Ca, Mg, Sr, Ba, and also B. The levels of these remaining impurities was considered to be too high for electrolysis. Hence, the aqueous solution of LiCl brine post nano-filtration was passed through ion exchange (IX) columns to remove all these impurities to a level of <0.1 ppm (100 ppb). Based on the nano-filtration experiment described above, the average composition of the simulated post nano-filtration lithium brine aliquots is presented in Table 3 below.

TABLE 3

Composition and pH of Post Nano-Filtration Brine

| | Concentration (mg/L) | |
|---|---|---|
| Element | Target | Simulated Post Nano-Filtration Brine |
| Li | 48490 | 48460 |
| Na | 7999 | 9306 |
| K | 3126 | 4054 |
| Mg | 25.6 | 21.05 |
| Ca | 23.36 | 18.21 |

TABLE 3-continued

Composition and pH of Post Nano-Filtration Brine

| | | Concentration (mg/L) |
|---|---|---|
| Element | Target | Simulated Post Nano-Filtration Brine |
| Sr | 0.047 | 0.030 |
| B | 7.697 | 8.514 |
| S | 108.3 | 112.1 |
| pH | 8.9 | ~9.5 |

Lanxess MDS TP208™ and TP 260™ resins, both weakly acidic macroporous cation exchange resins with chelating iminodiacetic acid groups and aminomethylphosphonic groups, respectively, were employed successfully in removing alkaline earth metal ions to an acceptable level at <100 ppb.

Brine samples were analysed, and instruments calibrated, as described above in respect of the analysis of the samples post nano-filtration.

For quantification of the analytes of interest (Mg, Ca, Sr, Ba, B), a 1:10 dilution was used; for Li quantification, 1:10,000 dilution was needed. All brine samples were analysed in 1:10 and the Stock and Treated Bulk solutions were also analysed as 1:10,000 dilution to report the Li content; Li was not measured for intermittent column samples.

Figure 2:
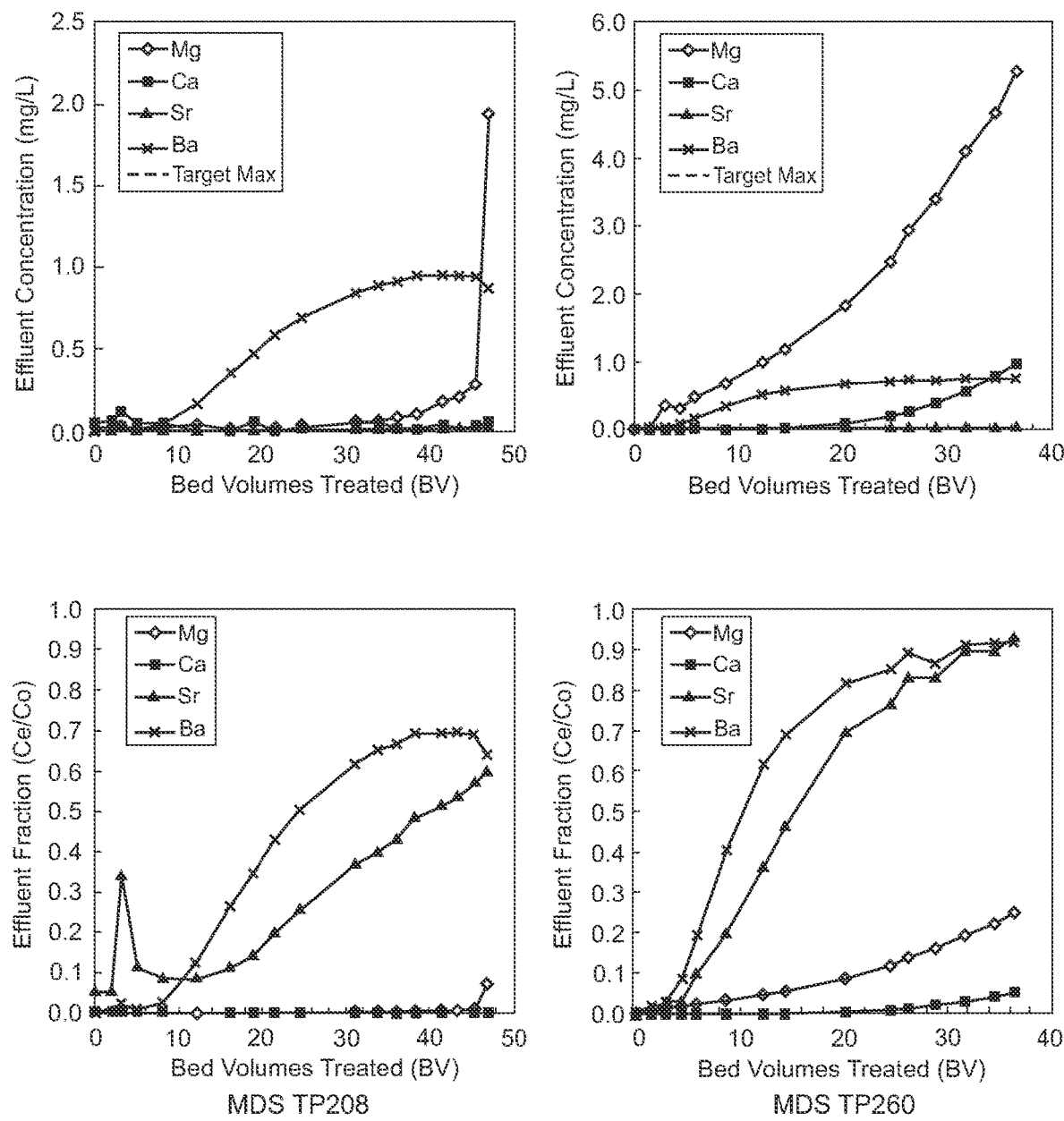
FIG. 2 is a series of breakthrough curves for alkaline earth metals present in the lithium brine passed to the first ion exchange step of the method of FIG. 1.

FIG. 2 shows breakthrough curves for the alkaline earth ions present in the lithium brine.

Figure 3:
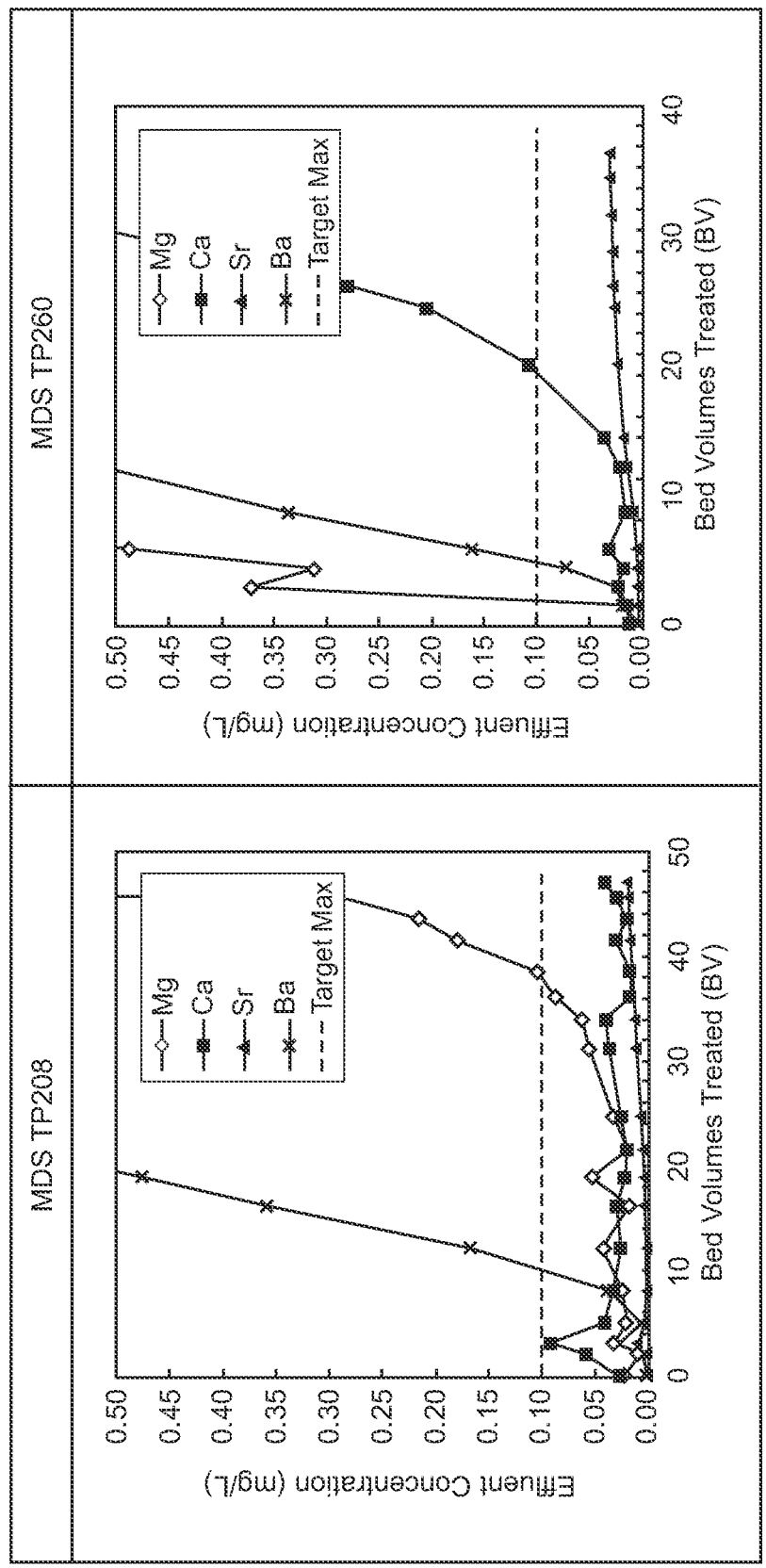
FIG. 3 is an expanded view of the breakthrough curves of FIG. 2.

It was apparent that in general the effectiveness of the MDS TP208™ resin was greater than MDS TP260™ resin. In more detail, it was recorded that barium had the least affinity for the resin exchange sites for both resins evaluated. Strontium was second least favoured, followed by magnesium and finally calcium ions. An expanded view of the breakthrough curves is shown in FIG. 3 in order to allow inspection of whether the target concentration of 0.1 mg/L was achieved.

Figure 4:
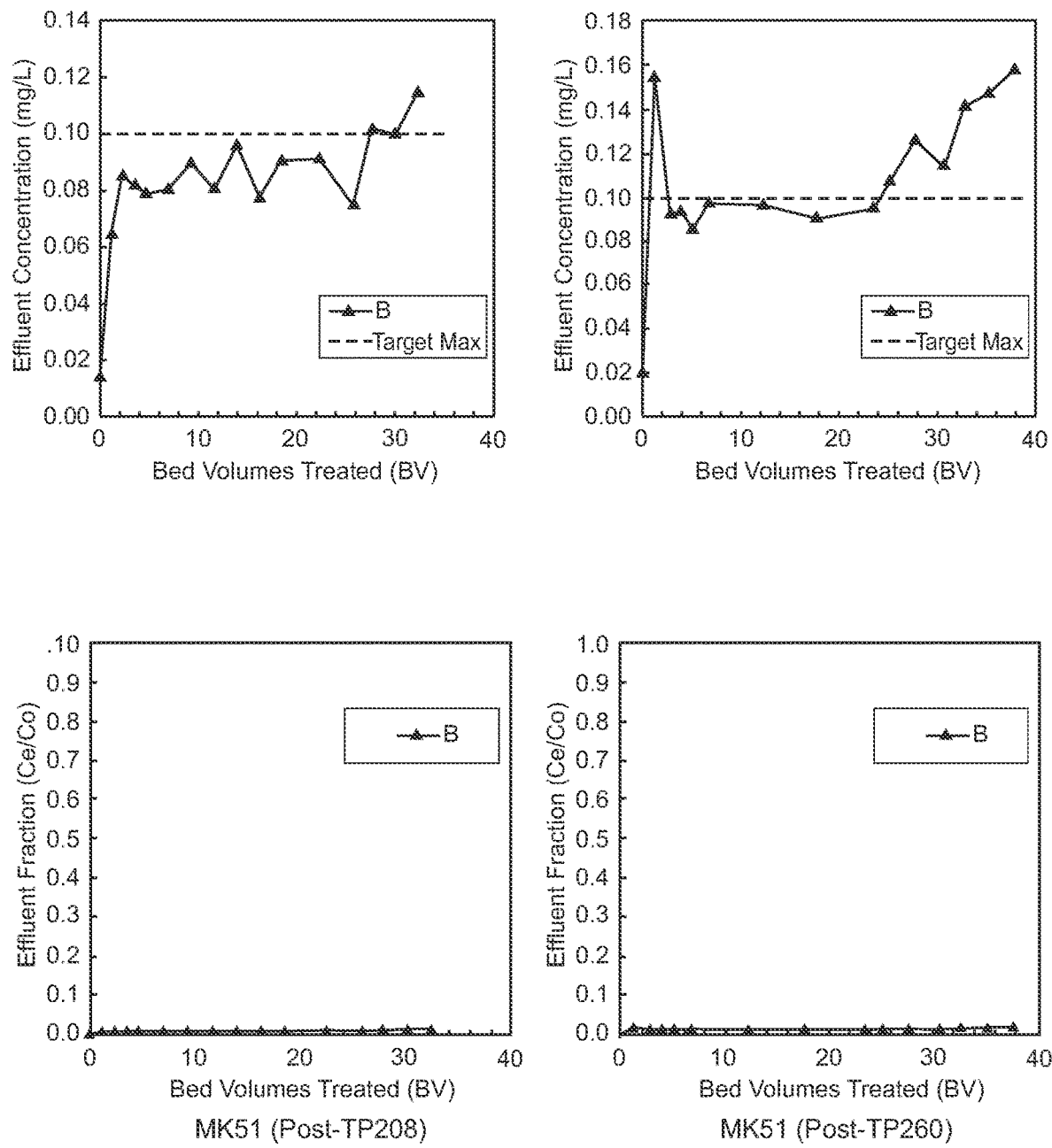
FIG. 4 is a series of breakthrough curves for boron removal in a second ion exchange step.

The Lewatit™ MK 51 resin, used as the second ion exchange step, showed consistent removal performance for both softened brines (brines post the first ion exchange step) treated. As shown in FIG. 4, MK51 removed 98% of B. Similar to the softening resins, the MK51 resin initially met the <0.1 mg/L boron target concentration, but ultimately exceeded this after 25-30 BV of treatment. The breakthrough profile for boron was typical of the "slippage" phenomena in resin beds. As such, MK51 resin performance was expected to benefit from operational improvements such as increased bed depth and bed diameter.

This further purified LiCl solution was now safely electrolysed to produce LiOH, and $Cl_2$ and $H_2$ gases are produced as by-products. The $Cl_2$ and $H_2$ gases are combined catalytically to produce HCl acid. Electrolysers typically may consist of an alternating series of anode and cathode plates with selective semi-permeable membrane between each anode and cathode. Direct current (DC) delivered to the electrolysers flows from the anode through the brine in the anode compartment through the membrane to the LiOH in the cathode compartment, and into the cathode.

Figure 5:
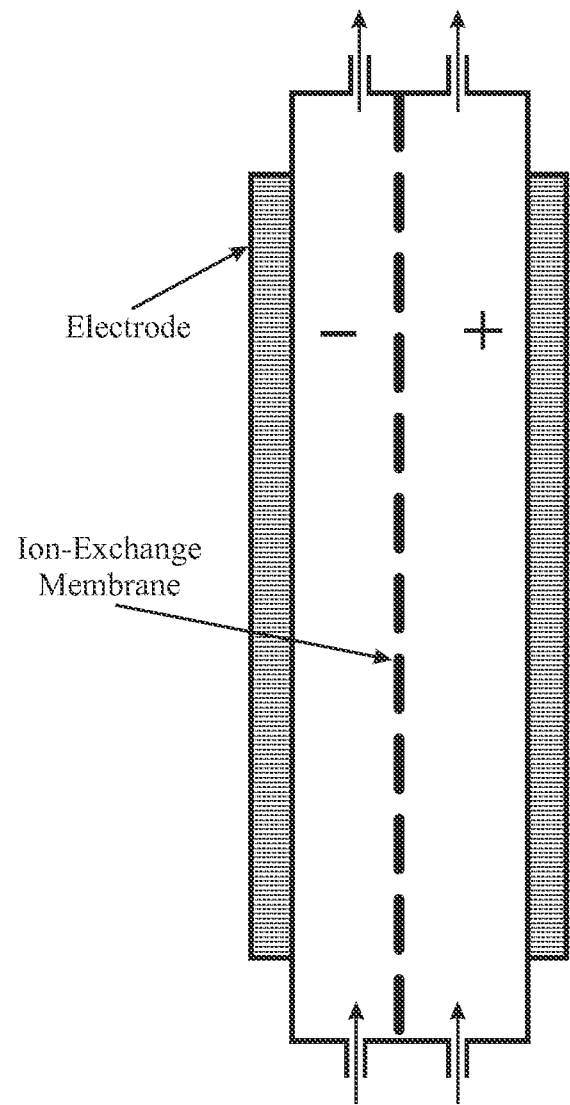
FIG. 5 is a schematic of the electrolyser constructed for the tests of electrolysis.

The electrolyser constructed for the tests was a filter press type cell, a schematic of which is shown in FIG. 5. In this cell, the anode and cathode were sandwiched with an ion-exchange membrane placed in-between them, the gap between the anode and membrane, and the cathode and membrane being dictated by the gasket thickness. The cell body was made of PlexiGlass (Cast Acrylic) and the gasket material being a 0.060 thick peroxide cured EPDM with 60 Durometer hardness to achieve 0.012-0.015 compression from the torqueing, made by Prince Rubber and Plastics Co., Inc. The anode was a Ti substrate coated with $RuO_2/IrO_2$ coating, analysing 40% $TiO_2$/30% $RuO_2$/30% IrO2, the $RuO_2$ and $IrO_2$ loadings being 3.45 and 4.34 g/m2 respectively; the standard electrode potential (SEP) being 1.12 V at 4.6 kA/m2 in 3M NaCl solutions. The cathode used was a Pt/Sn Activated Ni mesh from Chlorine Engineers Corporation.

Figure 6:
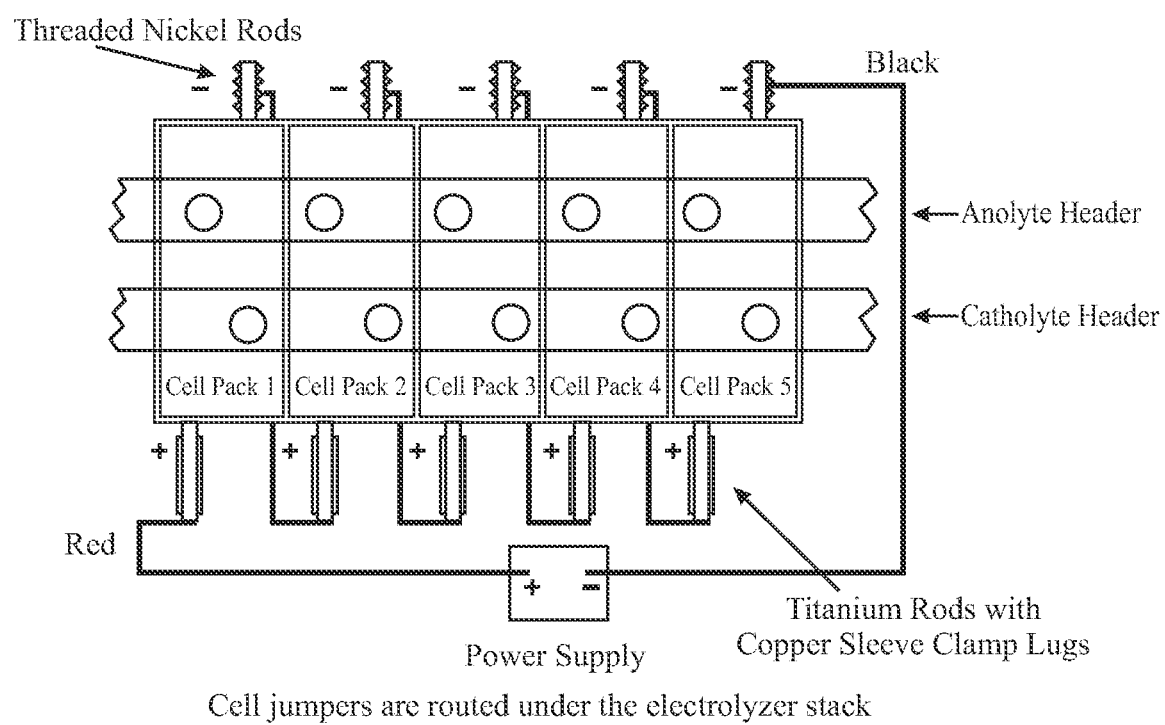
FIG. 6 shows the 5 cell stack used in the investigations of electrolysis, with particular reference to the electrical connections to the DC power supply.

The 5 cell stack used in the investigations is shown in FIG. 6, with particular reference to the electrical connections to the DC power supply.

The cell stack was assembled by stacking the 5 individual cells in series on tie rods and tightening each one of these rods by 0.009"/gasket squeeze using a torque wrench, and confirming by measuring the reduction of 0.09" over the width of the stack. Each cell was stacked in the order: Anode chamber/Anode/Gasket/Membrane/Gasket/Cathode/Cathode chamber. Fluorine grease was applied to the gasket behind the membrane towards the chamber/membrane.

The brine containing 300 gpl LiCl was heated to 50-70° C. and pumped to the bottom of the anode chamber and the depleted brine along with the chlorine gas exited the cell to a depleted brine tank, which was purged with nitrogen. A $Cl_2+N_2$ stream was then scrubbed with NaOH twice to dissolve the chlorine gas as NaOCl, which was neutralised with $NaHSO_3$ for disposal. The gas from the caustic scrubber was analyzed for $O_2$ using a Teledyne™ oxygen meter, 320P™ which uses a microfuel cell, before it was vented.

A 1-3% LiOH, diluted from the 5-9% product LiOH using distilled water (DI water), was fed to the bottom of the cathode compartment. The product caustic exited the cell to the catholyte recirculation tank and then to the LiOH product tank. The entire catholyte loop was purged with $N_2$ so that the hydrogen generated in the cell was swept and diluted to less than 4 volume %. The weight and the volume of product caustic from the cell were continuously measured for current efficiency calculations.

The expansion characteristics of several ion-exchange membranes were measured in 2% NaOH and 2% LiOH solutions to allow selection of the membrane for LiCl electrolysis, based on the magnitude of expansion in NaOH and KOH solutions, which is inversely proportional to the cathode efficiency.

Figure 7:
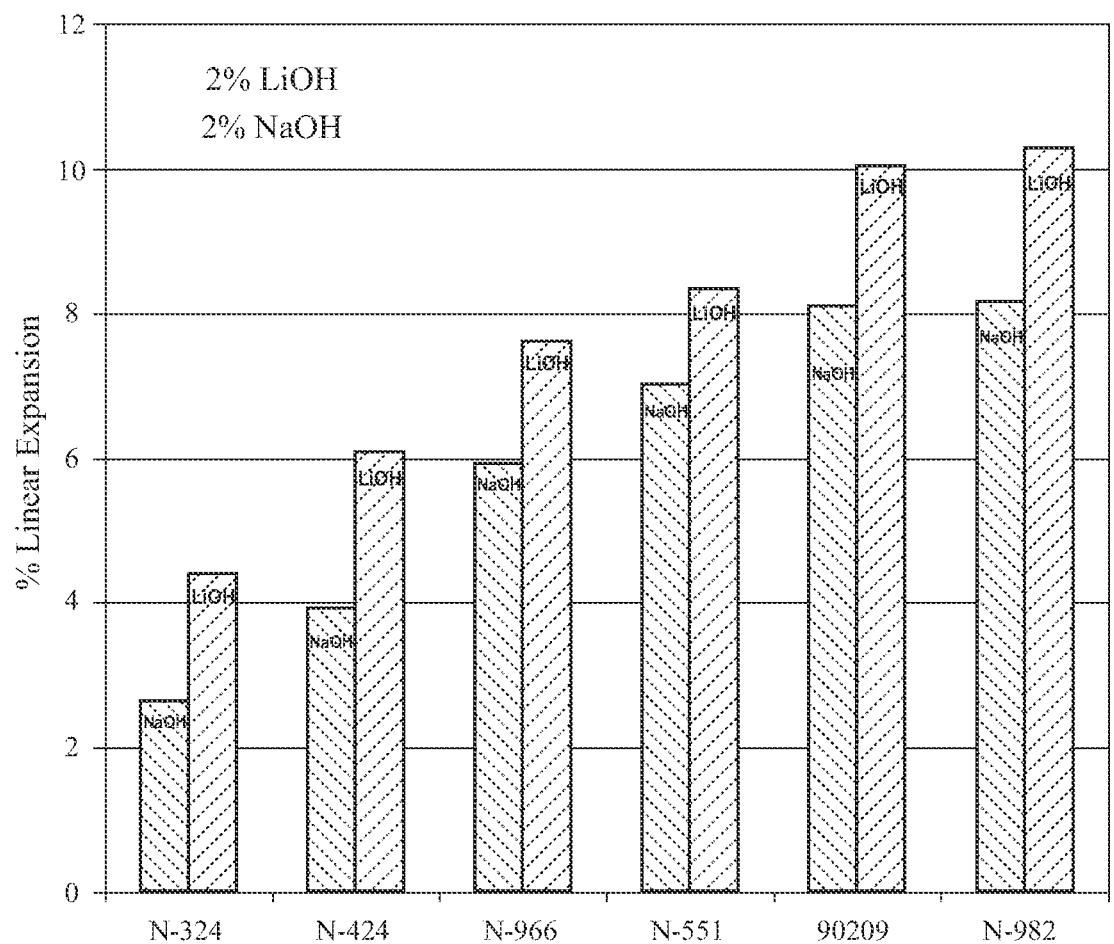
FIG. 7 shows the expansion characteristics of several ion-exchange membranes, measured in 2% NaOH and 2% LiOH solutions.

Results are presented in Table 4 below, and FIG. 7, and show all the membranes to expand more in LiOH solutions than in NaOH solutions, indicating potentially lower current efficiency for LiOH vs. NaOH. The lowest expansion in LiOH solutions was exhibited by N324 and N-424 membranes, which are sulfonic acid based. The membrane used in this investigation was N-424.

TABLE 4

Expansion of IX Membranes

|  | N-324(b) | N-424(a) | N-966(c) | N-551(b) | 90209(c) | N-982(c) |
|---|---|---|---|---|---|---|
| Initial Area (cm^2) | 100 | 100 | 100 | 100 | 100 | 100 |
| 2% NaOH | 105.34 | 108.08 | 112.22 | 114.56 | 116.87 | 117.04 |
| 2% LiOH | 109.02 | 112.59 | 115.81 | 117.39 | 121.12 | 121.67 |
| % Linear expansion in NaOH | 2.63 | 3.96 | 5.93 | 7.03 | 8.10 | 8.18 |
| % Linear expansion in LiOH | 4.41 | 6.11 | 7.62 | 8.35 | 10.05 | 10.30 |

Membranes were soaked in the caustic solutions at ~25 degrees C. for 20 hrs. Then, they were rinsed in DI water and the area measured with callipers.

(a)all Sulforic acid;
(b)Sulforic acid with different reinforcements;
(c)Sulfuric/Carboxylic acid The electrolyser was assembled by stacking the cell components with N424 membranes, pre-treated by first soaking them in 2% LiOH for 24 h at room temperature, and torqueing the tie-rods to achieve a tight seal without any leaks. The shiny side of the membrane was placed towards the cathode side.

The anode and cathode compartments were first filled with 2% LiCl and 2% LiOH, respectively. LiCl brine was pumped through the anode chamber and weak LiOH through the cathode chamber as the cell was energized. The membrane was initially conditioned by increasing the load at increments of 1.25 kA/m2/0.5 h to a final load of 5 kA/m2. The anolyte and catholyte flow rates were set based on the charge and material balance of the system. During shutdowns, the anolyte and catholyte concentrations were slowly lowered from the operating values of ~300 gpl LiCl and 3-4% LiOH, respectively, to 2% LiCl and 2% LiOH.

The cell stack was generally operated over a period of 6 to 8 hrs. The parameters measured during the cell operation were: cell voltage, feed and depleted anolyte and catholyte concentrations, and temperature in the anode and cathode compartments.

To avoid chlorine excursions in the laboratory environment, the chlorine generated from the cell was purged with $N_2$ into a closed tank. The exit gases containing chlorine were reacted in two 30% NaOH scrubbers in series before passing it through the $O_2$ meter. The $Cl_2$-free, oxygen containing $N_2$ was then vented in to the fume hood.

Chloride concentrations were determined by density measurements, from the relationship at 30° C.:

$$X = -205.2893 + 162.897\ d + 105.8709\ d2 - 63.0451\ d3$$

where d=density and X=Wt % LiCl, complemented randomly by volumetric analysis using AgNO3 with sodium chromate indicator. The anolyte samples used were treated with hydrogen peroxide to remove all the dissolved chlorine species, prior to titrations and density measurements.

The depleted chloride levels measured in this set-up gave falsely low chlorine efficiency values because all the dissolved chlorine species formed from the reaction of chlorine with the back-migrated LiOH were reduced to chloride ions, when the anolyte sample was treated with $H_2O_2$.

LiOH concentrations were determined by weighing the amount of LiOH and its volume collected over a given time, and also by analysing the amount of LiOH in the feed and exit streams by titration with HCl using 1% phenolphthalein indicator.

% oxygen in the exit gas following chlorine scrubbing was determined using a portable oxygen analyser, Teledyne™ Model 320P™. From the total volume of gas flow, the volume of $O_2$ generated during electrolysis was calculated.

LiOH current efficiency was calculated from the amount of LiOH produced during electrolysis using Faraday's law. Chlorine efficiency was calculated from the measured % $O_2$ in the cell gas. The theoretical basis for these calculations is as follows.

The components of chlorine ($\eta Cl_2$) and caustic ($\eta LiOH$) current efficiency, based on charge and material balances around a membrane cell, are as follows.

$$\eta_{Cl_2} = 1 - \eta_{O_2} - \eta_{Cl_2}^a$$

$$\eta_{LiOH} = 1 - \eta_{O_2} - \eta_{LiOH}^a$$

$\eta_{O_2}$ refers to the current efficiency for oxygen generation, $\eta_{Cl_2}^a$ to the current efficiency for the formation of $ClO_3^-$, OCl- and HOCl and dissolved chlorine in the anolyte, and $\eta_{LiOH}^a$ to the current efficiency for the hydroxyl ions transported to the anolyte. Chlorine and caustic efficiencies will be same if the feed brine is neutral and when there are no active chlorine species in the anolyte. Caustic efficiency is equal to process chlorine efficiency, defined as the chlorine efficiency when all the chlorine values from the anode side, i.e. gaseous chlorine, dissolved chlorine, chlorine values in HOCl, OCl⁻, and chlorate, are recovered.

When all the active chlorine species are recovered:

$$\eta_{Cl_2} = 1 - \eta_{O_2}$$

$$\eta_{LiOH} = 1 - \eta_{O_2}$$

When all the chlorine species are reacted, the current efficiency for chlorine or the % $O_2$ can calculate using the relationship:

$$\%\ O_2 = \frac{1 - \eta_{Cl_2}}{1 + \eta_{Cl_2}}$$

$$\%\ Cl_2 = \frac{1 - \%\ O_2}{1 + \%\ O_2}$$

Figure 8:
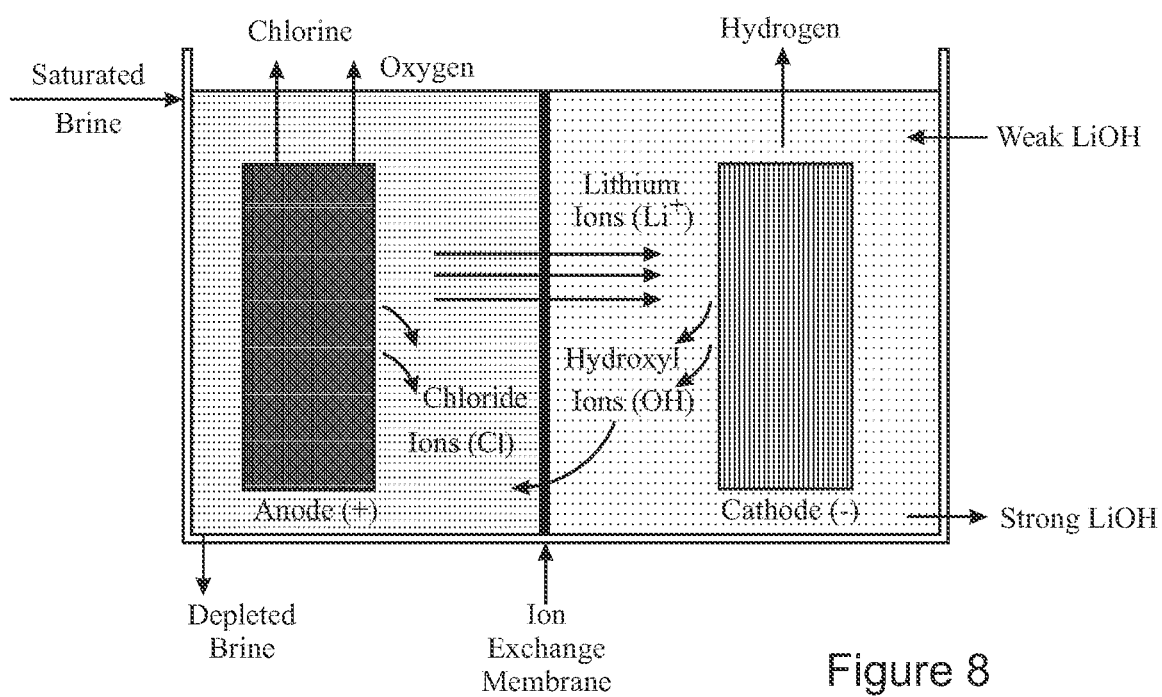
FIG. 8 shows the primary electrode reactions and the transport of hydroxyl ions leading to current inefficiency in membrane cells during electrolysis.

FIG. 8 depicts the primary electrode reactions and the transport of hydroxyl ions leading to current inefficiency in membrane cells.

The current efficiency values calculated based on LiOH analysis were found to be consistent with the process efficiency values based on oxygen analysis. The efficiency for LiOH generation decreases with increasing concentration of LiOH, and increases with increasing current density. The caustic current efficiency with N424 membranes was higher than the values reported with N982 membranes, and higher at 50° C. than at 90° C., the maximum efficiency realized being 80% at 4% LiOH, at 5 kA/m² and an operating temperature of 50° C.

Based on this data, the energy consumption to produce 1 ton of LiOH·H₂O at 5 kA/m 2 is ~3800 D.C. kWh/ton, at a caustic efficiency of ~80% and a cell voltage of 4.7 V, which may be compared to the theoretical energy consumption of 1425 D.C. kWh/ton at 100% efficiency. The high energy consumption was largely because of a higher cell voltage of 4.66 V vs. the expected value of 3.8V (based on NaOH system) rather than being due to low efficiency. The Applicants determined this to be within the expected range.

In general, the electrochemical reactions may be expressed as set out below. Chlorine gas is evolved, and depleted brine is discharged, in the anode compartment. Cooled recycled LiOH is fed to the cathode where hydrogen gas is evolved and strengthened LiOH is discharged. The chemical reactions occurring are as follows.

$$2LiCl = 2Li + Cl_2 + 2e-$$

$$2H+ + 2OH- + 2e- = H2 + 2OH-$$

$$2Li+ + 2OH- = 2LiOH$$

The impurities present in the brine solution, such as NaCl and KCl, also undergo electrolysis, and are accumulated in the catholyte.

$$2NaCl = 2Na + Cl_2 + 2e-$$

$$2H+ + 2OH- + 2e- = H2 + 2OH-$$

$$2Na+ + 2OH- = 2NaOH$$

$$2KCl = 2K + Cl_2 + 2e-$$

$$2H+ + 2OH- + 2e- = H2 + 2OH-$$

$$2K+ + 2OH- = 2KOH$$

Chlorine and hydrogen gases are catalytically combined to produce HCl acid. This HCl acid may be recycled in HCl acid leaching of the concentrate, if appropriate and available.

$$H_2 + Cl_2 = 2HCl$$

Multiple effect low temperature and high vacuum crystalliser systems are now be employed for the production of high purity 'battery grade' lithium hydroxide monohydrate (LiOH·H₂O) crystals. LiOH liquor along with impurities such as NaOH and KOH produced by electrolysis of LiCl is pre-heated in the vapour pre-heater. Low pressure steam is then introduced to cause evaporation of water.

Concentrated LiOH solution containing solid monohydrate crystals are collected and pumped to a concentrator unit and then fed to centrifuge. The mother liquor overflows from the concentrator unit and centrifuge is collected in mother liquor collection tank. The spent liquor after centrifuging LiOH·H₂O crystals is used to produce lithium carbonate by carbonation of this liquor. The crude LiOH·H₂O crystals are re-dissolved into deionized water, and recrystallised. This produces high purity battery grade LiOH·H₂O.

In the centrifuge, wash water is applied and collected along with mother liquor which is recycled. Wet monohydrate crystals are fed to the dryer unit where hot air is passed to dry the wet crystals. Medium pressure steam is used to heat the air.

LiOH spent liquor from the crystallisation unit is used to convert into lithium carbonate. Condensed CO₂ gas is bubbled through the LiOH liquor at 90° C. where lithium bicarbonate is first produced which decomposes to produce lithium carbonate. Lithium carbonate thus obtained is filtered, washed, dried and pulverized to the desired particle size and packed. The reaction taking place is as follows.

$$LiOH + CO_2 = LiHCO_3$$

$$2LiHCO_3 + Heat = Li_2CO_3 + CO_2 + H_2O$$

The slurry is fed to a centrifuge. The mother liquor which overflows from the concentrator unit and centrifuge is collected in mother liquor collection tank. Lithium carbonate is formed along with carbonates of Na and K, which remain in the solution.

In the centrifuge, as above for LiOH·H₂O, wash water is applied and collected along with mother liquor which is recycled. Wet Li₂CO₃ crystals are fed to the dryer unit where hot air is passed to dry the wet crystals. Medium pressure steam is used to heat the air.

After drying, lithium carbonate is micronised to the desired particle size as may be specified.

The specifications of the lithium hydroxide monohydrate and lithium carbonate products that can be obtained using the method of the present invention are provided in FIGS. 9 and 10, respectively.

As can be seen from the above description, the method of the present invention provides a method by which brines solution may be processed to provide a lithium bearing solution that is suitable for further processing by electrolysis, without the need for initial conversion of the brine to lithium carbonate and subsequent causticisation by hydrated lime. The need for a bicarbonation circuit in the production of lithium carbonate is also avoided.

Modifications and variations such as would be apparent to the skilled addressee are considered to fall within the scope of the present invention.

The invention claimed is:

1. A method for the processing of lithium containing brines, the method comprising the method steps of:
   (i) Passing a lithium containing brine to a filtration step to remove sulphates;
   (ii) Passing a product of step (i) to a first ion exchange step to remove divalent impurities;
   (iii) Passing a product of step (ii) to a second ion exchange step to remove boron impurities from the lithium brine to a level of less than 0.1 ppm;
   (iv) Passing a product of step (iii) to an electrolysis step to produce lithium hydroxide; and
   (v) Passing a product of step (iv) to a crystallisation step that in turn provides a lithium hydroxide monohydrate product.

2. The method of claim 1, wherein the method further comprises passing a spent liquor from the crystallisation step (v) to a carbonation step (vi) in which the spent liquor is reacted with carbon dioxide forming lithium bicarbonate.

3. The method of claim 2, wherein the thus formed lithium bicarbonate is heated in a heating step (vii) to precipitate lithium carbonate.

4. The method of claim 3, wherein the method further comprises washing, drying and micronising the precipitated lithium carbonate.

5. The method of claim 4, wherein the filtration step (i) utilises nano-filtration.

6. The method of claim 2, wherein the filtration step (i) removes sulphates from the lithium containing brine to a level of less than 1 grams per liter.

7. The method of claim 1, wherein the ion exchange step (ii) removes divalent impurities selected from the group of calcium, magnesium, strontium, and barium.

8. The method of claim 7, wherein the ion exchange step (ii) removes divalent impurities from the lithium brine to a level of less than 0.1 ppm.

9. The method of claim 3, wherein the filtration step (i) removes sulphates from the lithium containing brine to a level of less than 1 grams per liter.

10. The method of claim 3, wherein the lithium carbonate product is of battery grade.

11. The method of claim 1, wherein the filtration step (i) utilises nano-filtration.

12. The method of claim 1, wherein the filtration step (i) removes sulphates from the lithium containing brine to a level of less than 1 grams per liter.

13. The method of claim 1, wherein the lithium hydroxide monohydrate product is of battery grade.

14. The method of claim 1, wherein the ion exchange step (ii) removes divalent impurities from the lithium brine to a level of less than 0.1 ppm.

* * * * *